Figure 1:
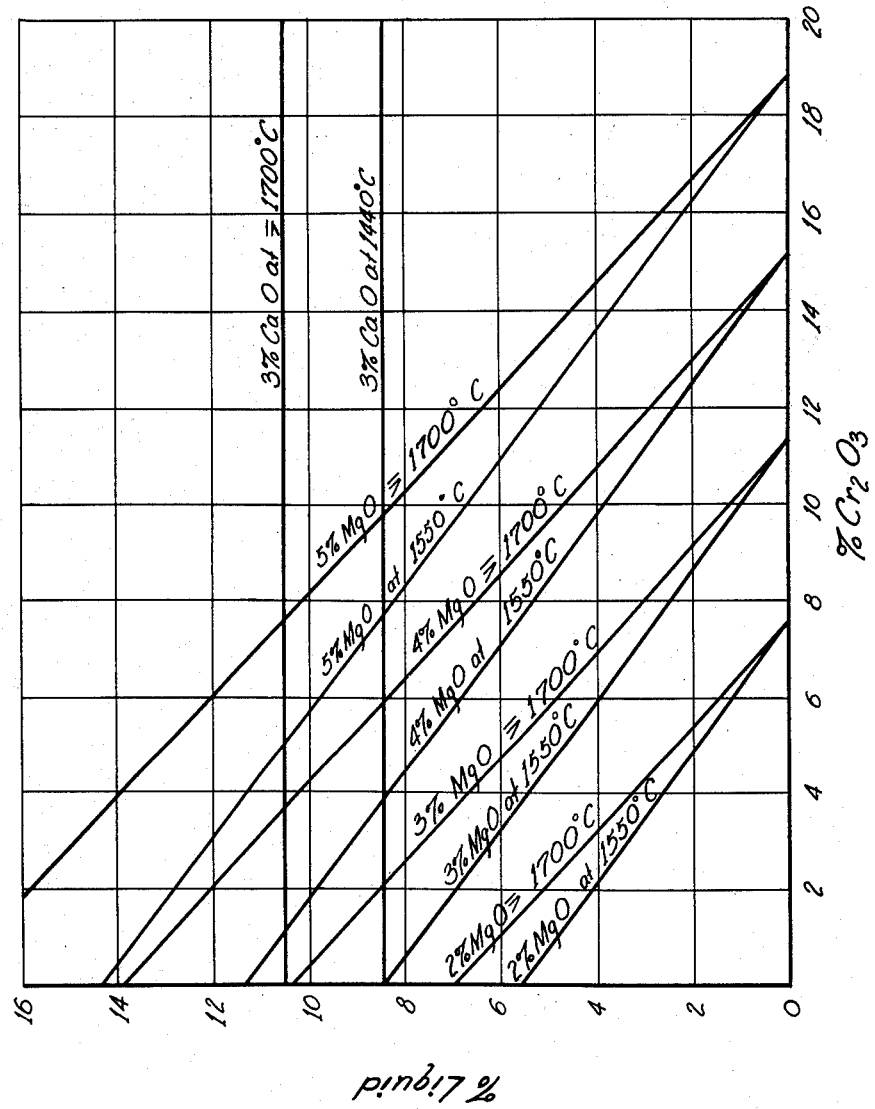

March 19, 1963  E. F. OSBORN  3,082,105
CHROME SILICA BRICK
Filed Sept. 29, 1960

INVENTOR
Elburt F. Osborn

BY Natt M Emery Jr.
ATTORNEY

3,082,105
CHROME SILICA BRICK
Elburt F. Osborn, State College, Pa., assignor to Bethlehem Steel Company, a corporation of Pennsylvania
Filed Sept. 29, 1960, Ser. No. 59,215
2 Claims. (Cl. 106—59)

This application is a continuation-in-part of a previous application, Serial No. 735,692, for "Chrome Silica Brick," filed May 16, 1958, now abandoned.

This invention relates to highly refractory slag resistant silica brick which contains chrome oxide, and is particularly suitable for use in open hearth furnaces.

The service conditions which refractories must meet in open hearth furnaces are extremely severe. High temperatures, chemical attack by slags and vapors containing iron oxide and other fluxes, heavy loads, wide temperature fluctuations, abrasion and mechanical abuse all combine to destroy refractories at various sections of the furnace. To meet these varying conditions refractory silica brick is commonly employed.

When silica brick is subjected to the action of iron oxide rich slags, the iron oxide combines with the silica and forms a low melting eutectic. As the melting point of this iron oxide-silica eutectic is below the operating temperature of the furnace, a liquid phase forms, causing the brick to progressively soften as more and more iron oxide penetrates the brick. As a result of this softening, the brick either wastes away by loss of the liquid phase when the amount of liquid becomes excessive or is easily worn away by the abrasive action of the high iron oxide slag which is suspended in the furnace gases as droplets.

An object of this invention is to increase the resistance of silica brick to the chemical attack of iron oxide.

Another object is to increase the resistance of silica brick to the abrasive action of the slag.

Still another object is to increase the refractoriness of silica brick by decreasing the amounts of low melting eutectics and reducing the total sum of liquid present at the operating temperatures of open hearth furnaces.

I have found that these objectives can be achieved by the addition of chrome oxide within certain ranges to the silica brick, together with other elements also within certain ranges.

There is practically complete insolubility between chrome oxide and silica in the liquid state, with the eutectic between silica and chrome oxide occurring at a temperature very near the melting point of pure silica.

When a silica brick containing chrome oxide comes in contact with liquid iron oxide, the chrome oxide causes the iron oxide to solidify by taking it into solid solution forming a high melting spinel. Thus, a silica brick containing chrome oxide will have less liquid formation than will the ordinary silica brick as these refractories are attacked by iron oxide at furnace temperatures. Furthermore, as iron oxide is absorbed by the chrome oxide, a hard layer of refractory spinel and cristobalite forms on the brick surface exposed to the iron oxide. This layer not only helps to prevent further penetration by the iron oxide, but increases the brick's resistance to the abrasive action of the slag itself.

Silica brick becomes more resistant to the attack of iron oxide at high temperatures with the addition of as little as 1% chrome oxide, and this resistance progressively increases, with a desirable maximum of about 20% chrome oxide. For reasons hereinafter set forth, my brick contains a minimum of 4% chrome oxide.

A refractory brick must not only meet the operating conditions of the furnace, but must also be sufficiently strong to enable it to be handled, transported, and installed in the furnace without being damaged. To impart this needed strength to the brick, it is necessary to add a binding agent, and in the case of silica brick the most common binding agents are lime and iron oxide.

However, to obtain the superior brick of my invention, I use magnesia as the binder in an amount of 1–4%, with 2–3% being the preferred range.

Binding agents are both beneficial and harmful to the brick. They are beneficial because they impart strength to the brick, and are harmful because they form eutectics which are liquid at the operating temperatures of the furnace, and their presence thereby increases the total amount of liquid formed in the brick.

I prefer to use magnesia as the binding agent, rather than lime or iron oxide, not only because magnesia forms less liquid than lime or iron oxide, but also because the amount of liquid formed by the magnesia can be controlled by the amount of chrome oxide in the brick. The chrome oxide combines with the magnesia to form a high melting eutectic, and if a sufficient amount of chrome oxide is present, the deleterious effects of the magnesia can be almost completely eliminated.

FIG. 1 illustrates the effect of lime and chrome oxide and magnesia and chrome oxide in a silica brick. The abscissae represent the percent of chrome oxide in the brick while the ordinates represent the percent of liquid in the brick. At 1700° C. and with no chrome oxide content, the brick will contain approximately 10% liquid, whether the binder in an amount of 3% is lime or magnesia. As chrome oxide is added to a silica brick having 3% magnesia as a binder, at a specified temperature, the percentage of liquid present will be progressively less until there is sufficient chrome oxide present to combine with all the magnesia. Thus about 8% chrome oxide will combine with 2% magnesia, 11% chrome oxide will combine with 3% magnesia, and 15% chrome oxide will combine with 4% magnesia, when the operating temperature is about 1700° C.

The use of lime as a binder would produce an inferior brick. As shown in FIG. 1, the addition of chrome oxide to a silica brick containing 3% lime does not reduce the liquid content of the brick at elevated temperatures. At 1700° C. the brick would have over 10% liquid no matter how much chrome oxide, within the range of my invention was added.

Certain oxides, such as alumina and alkali (particularly the oxides of sodium and potassium), and the oxides of calcium, magnesium, strontium, manganese, zinc, nickel, cobalt, iron, titanium, and barium are frequently combined with silica and chrome oxide in their natural state. If these oxides are present in silica brick, they combine with the silica to form low melting eutectics, thereby increasing the amount of liquids which are formed in the brick at or below the operating temperatures and lowering the refractoriness and effectiveness of the brick.

As the refractoriness of the brick is determined by the amount of liquid present in the brick at any given temperature, and as only a small amount of liquid can be tolerated, it is necessary that the amount of the above mentioned oxides present in my brick be limited so that the amount of liquid formed at the operating temperature does not exceed the allowable limits. To hold this liquid formation within the desired limits, my brick should not contain more than .5% alumina and alkali combined, and not more than 4% total amount of the oxides of calcium, magnesium, strontium, manganese, zinc, nickel, cobalt, iron, titanium, and barium, with the oxide of calcium not over about .5%. As previously mentioned, silica and chrome oxide are frequently found in their natural state combined with many of these oxides, and therefore chrome oxide and silica of relatively high purity must be used in forming my brick in order that the amount of these oxides in my brick does not exceed the desired limits.

Although magnesia is added to my brick in preferred amounts of about 2-3%, and although as much as 4% can be tolerated, it is understood that despite this addition of magnesia, the total amount of oxides of magnesium, calcium, etc. in my brick should not exceed the 4% limit heretofore set forth.

In the light of the foregoing explanation, the brick of my invention therefore will be composed of 4-20% chrome oxide, not more than .5% alumina and alkali combined, not more than 4% of the oxides of calcium, magnesium, strontium, manganese, zinc, nickel, cobalt, iron, titanium and barium combined, with the oxide of calcium not over about .5% and the balance consisting essentially of silica.

An example of my invention is a brick containing 5% chrome oxide, .5% combined alumina and alkali, 4% of the oxides of calcium, magnesium, strontium, manganese, zinc, nickel, cobalt, iron, titanium and barium combined, with the oxide of calcium .5%, and 90.5% silica.

Another example of my brick containing a magnesia binder is one containing 9% chrome oxide, 2% magnesia, .4% alumina and alkali, not more than 1.5% of the group of oxides consisting of strontium, manganese, zinc, nickel, cobalt, iron, titanium, and barium, not more than .5% oxide of calcium, and the balance consisting essentially of silica. After 47 heats in a furnace, this brick was approximately 1 inch longer than standard brick employed in the same furnace.

Another advantage in adding chrome oxide to silica brick is that the chrome oxide combines with part of any alumina present and takes it into solid solution by forming a crystalline phase with a melting point higher than the operating temperature of an open hearth furnace, thereby decreasing the amount of low melting alumina silica eutectic, and decreasing the amount of liquid present at operating temperatures.

As the ability of silica brick to withstand the various destructive forces within the open hearth furnace, and the temperature at which the furnace is operated depend in large part on the amount of liquid present in the brick at operating temperatures, the advantages of my brick are readily apparent. Having reduced the total amount of liquid in the brick at operating temperatures, my brick is better able to withstand heavy loads and the abrasive action of the slag, and, where desired, permits the furnace temperatures to be increased to where the allowable amount of liquid is again formed.

An example of the best mode that I contemplate for producing the brick of my invention, the chrome silica brick of the examples aforesaid, is to blend ground silica, high purity chrome oxide, and magnesia, the last being added as a binding agent, and all three being low in alumina and alkali as hereinbefore set forth. Then form the above blend into a brick in a dry press in the normal manner; heat the brick for a period of 18½ to 20 days, including slowly heating the brick through the temperature ranges where expansion is critical, including a soaking period of 1½ to 2 days at about 1450° C., and including slowly cooling the brick to atmospheric temperature. The total heating, soaking, and cooling time may vary somewhat and depends on many factors familiar to those skilled in the art.

Throughout the specification, references to percentages mean percentage by weight.

I claim:

1. A refractory brick comprising chrome oxide, magnesia, and high purity silica, chrome oxide being present in an amount of about 4-20%, magnesia in an amount of about 1-4%, and the balance consisting essentially of silica.

2. A refractory brick comprising chrome oxide, magnesia, and high purity silica, chrome oxide being present in an amount of about 4-20%, magnesia in an amount of about 1-4%, and the balance consisting essentially of silica, said brick containing not more than .5% of the group of oxides consisting of alumina and alkali, and not more than 4% of the group of oxides consisting of calcium, magnesium, strontium, manganese, zinc, nickel, cobalt, iron, titanium, and barium, with the oxide of calcium not over about .5%.

References Cited in the file of this patent

Journal of The American Ceramic Society, vol. 37, No. 10, 1954, pp. 490-96.